(12) United States Patent
Kwok (10) Patent No.: US 8,240,231 B2
(45) Date of Patent: Aug. 14, 2012

(54) ENERGY STORAGE DEVICE AND METHOD OF USE

(76) Inventor: James Kwok, Runaway Bay (AU)

( * ) Notice: Subject to any disclaimer, the term of this patent is extended or adjusted under 35 U.S.C. 154(b) by 468 days.

(21) Appl. No.: 12/442,894

(22) PCT Filed: Sep. 25, 2007

(86) PCT No.: PCT/AU2007/001417
§ 371 (c)(1),
(2), (4) Date: Nov. 18, 2009

(87) PCT Pub. No.: WO2008/037004
PCT Pub. Date: Apr. 3, 2008

(65) Prior Publication Data
US 2010/0117375 A1    May 13, 2010

(30) Foreign Application Priority Data

Sep. 25, 2006    (AU) .................. 2006905283

(51) Int. Cl.
*F16F 15/30* (2006.01)
(52) U.S. Cl. ...................... 74/572.1; 192/48.1
(58) Field of Classification Search .............. 74/572.1; 192/48.1
See application file for complete search history.

(56) References Cited

U.S. PATENT DOCUMENTS

| | | | | |
|---|---|---|---|---|
| 3,479,905 A | * | 11/1969 | Helrigel | 74/572.1 |
| 4,688,419 A | | 8/1987 | D'Angelo et al. | |
| 5,105,680 A | * | 4/1992 | Naudin | 464/68.3 |
| 5,848,938 A | * | 12/1998 | Curtis et al. | 464/68.41 |
| 7,053,589 B2 | | 5/2006 | Gabrys et al. | |
| 2003/0041688 A1 | | 3/2003 | Yamazaki | |
| 2011/0290610 A1 | * | 12/2011 | Arnold et al. | 192/48.1 |

FOREIGN PATENT DOCUMENTS

| | | |
|---|---|---|
| DE | 2602028 | 1/1976 |
| DE | 2755313 | 12/1977 |
| DE | 19809425 A1 | 9/1999 |
| EP | 612915 A1 * | 8/1994 |
| FR | 2490766 A * | 3/1982 |
| GB | 2107428 A * | 4/1983 |
| JP | 2007309452 A * | 11/2007 |
| WO | 01/84693 | 11/2001 |

OTHER PUBLICATIONS

International Search Report for corresponding application No. PCT/AU2007/001417 completed Dec. 3, 2007.

* cited by examiner

*Primary Examiner* — Joseph Waks
(74) *Attorney, Agent, or Firm* — Renner, Otto, Boisselle & Sklar, LLP (57) ABSTRACT

An energy storage device including at least one shaft member, at least a pair of flywheels including a first flywheel and a second flywheel larger than the first flywheel, each flywheel associated with the at least one shaft member, a clutch assembly associated with each of the flywheels, at least one low power input device, and a power take off means associated with the second flywheel, wherein the first flywheel is rotated using a low power input device and is accelerated to a predetermined rotational velocity whereupon the clutch assembly engages to connect the first and second flywheels allowing inertial and kinetic energy to transfer between the flywheels to accelerate the second flywheel.

22 Claims, 5 Drawing Sheets

ENERGY STORAGE DEVICE AND METHOD OF USE

This application is a national phase of International Application No. PCT/AU2007/001417 filed Sep. 25, 2007 and published in the English language.

FIELD OF THE INVENTION

The present invention relates to energy storage and discharge devices and particularly to those of a type known as flywheel energy storage devices.

BACKGROUND ART

A report published in February 1997 by Sandia National Laboratories entitled "*Cost Analysis of Energy Storage Systems for Electric Utility Applications*" contains a summary of the developments and the potential that energy storage systems of differing types have. Excerpts from that report are as follows:

"Energy Storage (ES) systems could potentially have widespread applications within the electric utility industry. Three promising storage technologies—Battery Energy Storage (BES), Superconducting Magnetic Energy Storage (SMES) and Advanced Flywheel Energy Storage (FES)—each meet some of the performance requirements of the 13 utility applications identified in the Battery Energy Storage for Utility Applications: Phase I—Opportunities Analysis study conducted by Sandia National Laboratories (SNL)."

"Both in terms of performance and cost, BES and SMES are well suited for power quality applications. Fast acting advanced FES also has the potential to serve this application and prototypes have been demonstrated. SMES and FES systems are in the early stages of market entry and are expected to primarily serve the customer-end power quality market."

There are typically three key components of ES systems, namely:

Storage Subsystems;
Power Conversion Subsystems (PCS); and
Balance of Plant (BOP).

From the above-identified report, it is known that the storage subsystem of a FES consists of a flywheel that stores kinetic energy by spinning at very high velocities (tens of thousands of revolutions per minute). The FES also consists of the radial and thrust magnetic bearings, centre post, containment and other components.

The power conversion subsystem for all three abovementioned subsystems includes a combination of rectifier/inverter, transformer, DC and AC switchgear, disconnects, breakers, switches and programmable high-speed controllers. A high speed motor/generator set is part of the power conversion system in the FES system. High speed solid-state transfer switches are used in power quality applications where high switching speeds are a requirement for the ES system.

The control system for ES systems has three main functions. The management and control of storage subsystem monitors the charge level, charge/discharge requirements, and related operations. The controls associated with the PCS subsystems monitors utility power supply and switches the load between the ES system and utility supply according to a predetermined algorithm. The facility control system monitors the temperature, ventilation and lighting in the facility that houses the hardware.

The balance of plant encompasses the facility to house the equipment, heating, ventilation and air conditioning (HVAC), the interface between the ES system and the customer/utility, the provision of services such as data gathering/trending, project management, transportation permits, training, spares and finance charges.

Prior art FES systems have been used mainly for automotive and space applications and have yet to become accepted due to their complexity, low net power output and fragility in operating conditions. For example, for automotive applications, dynamic isolation problems are present. Though the concept of flywheels is not new, low-loss flywheels that rotate at very high speeds are relatively new and undeveloped.

A typical prior art centrifugal clutch consists of three parts:
  An outer drum that turns freely—this drum includes a sprocket that engages the chain. When the drum turns, the chain turns.
  A centre shaft attached directly to the engine's crankshaft—if the engine is turning, so is the shaft.
  A pair of cylindrical clutch weights attached to the centre shaft, along with a spring that keeps them retracted against the shaft.

The centre shaft and weights spin as one. If they are spinning slowly enough, the weights are held against the shaft by the spring. If the engine spins fast enough, however, the centrifugal force on the weights overcomes the force being applied by the spring, and the weights are slung outward. They come in contact with the inside of the drum and the drum starts to spin. The drum, weights and centre shaft become a single spinning unit because of the friction between the weights and the drum. Once the dram starts turning, so does the chain.

There are several advantages to a centrifugal clutch:
  It is automatic. (A centrifugal clutch does not use a clutch pedal for engagement and disengagement.)
  It slips automatically to avoid stalling the engine. (In a car, the driver must slip the clutch.)
  Once the engine is spinning fast enough, there is no slip in the clutch as the faster the engine is travelling, the greater the force exerted on the engagement.

Centrifugal clutches are typically used in automotive applications. As such, they are generally mounted horizontally. There are a variety of problems present in adapting the conventional centrifugal clutch to use in flywheel energy storage systems as will become apparent from the following discussion.

It will be clearly understood that, if a prior art publication is referred to herein, this reference does not constitute an admission that the publication forms part of the common general knowledge in the art in Australia or in any other country.

SUMMARY OF THE INVENTION

The present invention is directed to an energy storage device, which may at least partially overcome at least one of the abovementioned disadvantages or provide the consumer with a useful or commercial choice.

In one form, the invention resides in an energy storage device including
  a. at least one shaft member;
  b. at least a pair of flywheels including a first flywheel and a second flywheel larger than the first flywheel, each flywheel associated with the at least one shaft member;
  c. a clutch assembly associated with each of the flywheels;
  d. at least one low power input device; and
  e. a power take off means associated with the second flywheel;

wherein the first flywheel is rotated using a low power input device and is accelerated to a predetermined rotational velocity whereupon the clutch assembly engages to connect the first and second flywheels allowing inertial and kinetic energy to transfer between the flywheels to accelerate the second flywheel.

In a second form, the invention resides in an energy storage device including
 a. at least one shaft member;
 b. a first flywheel;
 c. at least one low power input device for rotating the first flywheel to a predetermined rotational velocity;
 d. a second flywheel of greater dimension than the first flywheel;
 e. a clutch assembly associated with the first and second flywheels for separating the flywheels and engaging the first flywheel with the second flywheel upon the first flywheel attaining the predetermined velocity; and
 f. a power take off means associated with the second flywheel.

In a third form, the invention resides in a method of storing energy input from a low power input device until a useable amount of power is stored and releasing when required, the method including the steps of:
 a. providing a flywheel energy storage system including a first and a second larger flywheel mounted on a shaft and separated but connectable by a clutch assembly;
 b. accelerating the first flywheel to a predetermined rotational velocity using a low power input device;
 c. engaging the clutch assembly once the first flywheel has attained the predetermined velocity to connect the first and second flywheels; and
 d. providing a power take off means associated with the second flywheel to utilize the rotation of the second flywheel to withdraw useable power from the system.

According to the invention, the first flywheel will be accelerated using a low power input device and when the predetermined speed is reached, the clutch assembly will act to engage the first and second flywheel so that the inertia and kinetic energy associated with the first flywheel can accelerate the second flywheel.

Obviously, the engagement of the second flywheel and the fact that the second flywheel will be at a lower rotational velocity (it may even be stationary) than the first flywheel will cause the first flywheel to slow. The low power input device will preferably continue to add power to the first flywheel to decrease the amount of slowing, but in time, the second flywheel will attain the rotational velocity of the first flywheel and be accelerated to the predetermined rotational velocity by the low power input device. Preferably, once the initial inertia of the second flywheel is overcome and it begins to rotate, the low power input device will have sufficient power to accelerate both flywheels back to the predetermined speed. It is therefore important to minimize the energy losses in the device to ensure that as much of the input power or energy is directed towards accelerating (and thereby being stored in) the flywheel system. Once the second flywheel is rotating at the predetermined velocity, the power take off means may be engaged and disengaged as needed to withdraw energy stored in the system.

The stored energy in a flywheel rotating at a given rate is proportional to the flywheel's moment of inertia multiplied by the square of its angular speed. Therefore, high velocities are required to store large amounts of energy. Flywheels with speeds of tens of thousands of revolutions per minute (RPM), up to 100,000 RPM, have been tested. The flywheel configuration is driven by the need to have the maximum moment of inertia for a given weight. Light weight composite materials are typically used to form the flywheels in order to withstand the stresses created during the high-speed operation of the flywheel. The use of magnetic bearings and a vacuum chamber can also help reduce losses.

The energy storage device of the present invention will typically store low power inputs which are introduced into the system over a relatively long time period to create a high power and/or prolonged release power source. The power available may be output as a short "burst" release or as a steady current release over a longer period. The rapid discharge systems are also called power ride-through systems where the discharge time is typically measured in seconds and long-term discharge types are usually used for power backup where discharge time is measured in hours.

A ride-through system is typically designed for discharging a high level of power for a short duration of time until an auxiliary energy generating means such as a generator set can be brought online. Discharge times range from 10 seconds to about 2 minutes with power levels of up to several hundred kilowatts. Applications for ride-through flywheel uninterruptible power supplies include computer data centres and also critical manufacturing operations such as semiconductor processing. Ride-through systems can also be used for rapid charging of batteries such as for use in electric cars and the like.

In marketing, ride-through flywheel systems can demand high prices because flywheel systems should have reliability and longevity advantages, and electrochemical batteries are inherently unsuitable and perform very poorly with repeated high power discharges.

The second category of flywheel systems, energy back-up, are used to provide power to support the load for the duration of a power interruption, until the utility power can be restored. Discharge times can be as much as 8 hours or more and the power levels are typically only a few kilowatts or less. Energy storage capacity though is large with multiple kilowatt-hours of storage. Promising applications for these systems are in telecommunications, for maintaining service reliability for telephone, cable TV, wireless and the Internet. Energy back-up flywheel uninterruptible power supplies are marketed based on their energy storage capacity, and because of the low power level, they compete with batteries primarily based on the increased longevity, higher reliability, and lower maintenance requirements. The more difficult cost targets for large energy back-up flywheel systems therefore make minimizing the cost per stored energy extremely important. The potential market for this application is enormous, so there has been considerable interest in developing flywheel energy back-up systems that would satisfy the industry requirements, all to no avail until now.

The system of the present invention will typically find application in power smoothing applications for internal combustion engines and other power equipment, uninterruptible power supplies, utility load levelling systems and electric vehicles.

The device generally and the flywheel system in particular will typically be enclosed by a housing both to protect the flywheel system from damage and energy depleting effects from external forces and also to prevent damage to surrounding objects should the flywheels rupture.

The preferred shape of housing is pyramidal with a base wall and converging members extending from the base wall and converging at a tip or point. The base wall may be rectangular or triangular. The converging members may be triangular shaped sidewalls. There may be either three or four sidewalls depending upon the configuration of the housing.

Provision of sidewalls allows the housing to be substantially sealed with the flywheel system inside. This can be important particularly where the housing defines the vacuum containment as discussed below.

Alternatively and less preferred, the converging members may be elongate members extending from the corners of the base wall and converging at the point or tip.

There are many different types of vacuum containment systems for flywheel energy systems such as that described in U.S. Pat. No. 7,053,589 and any of these may be used provided that they are suitable to maintaining the vacuum without leaching energy from the flywheel system.

The device of the present invention will preferably include at least one shaft member. There will typically be a single shaft member although it is possible to use more than one provided that all of the shafts are coaxially mounted.

The shaft may be appropriately mounted for rotation and in this form the shaft will be supported and/or oriented by one or more bearings. Alternatively, the shaft may be fixed and the flywheels may be mounted for rotation about the fixed shaft.

The shaft may be oriented horizontally or vertically, but a vertical orientation is preferred. A horizontally oriented shaft member will require multiple shaft support bearings which add to the friction in the system and effectively decreases the amount of energy which is transmitted to the flywheel.

The shaft will typically be of circular cross-section but will normally not be of constant dimension. The shaft will typically taper towards the smaller flywheel. Alternatively, the shaft may include a plurality of stepped portions of generally cylindrical shape and increasing in cross-sectional dimension as the flywheel dimension increase.

The shaft may be manufactured of materials similar to the flywheels as it will typically be subjected to the same forces albeit not to the same extent. Therefore the material used may be metal for lower speed applications and composite materials for higher speed applications.

The shaft will typically extend from adjacent the base wall of the housing where it may be located by a bottom mount or bearing to a top mount or bearing adjacent the tip or point of the housing, depending upon whether the shaft is a fixed or rotating shaft.

The device will also include at least two flywheels and more typically more than two. The flywheels will usually be annular in configuration with an opening to accept the shaft or the shaft with appropriate bearings, located in the centre of the flywheel.

Each flywheel will preferably have a stepped cross-section with a thinner outer annular portion surrounding or extending from a thicker central annular portion. The flywheels may be of unitary construction or they may be split flywheels, particularly the larger flywheels. The split-system flywheel is to allow the thrust/load of the flywheel to be well distributed on the shaft both radially and longitudinally to reduce the friction loss.

There will suitably be a number of flywheels in the flywheel system. The flywheels are preferably staged along the length or height of the shaft member with a clutch assembly located between each of the flywheels. The flywheels will preferably increase in dimension toward one end of the shaft, the increase in dimension having a related increase in inertia. Locating the smallest of the flywheels at the top of a vertically oriented shaft is preferred for stability reasons but is not absolutely required. Of course, if the shaft is horizontally located, then the small flywheel may be at either end.

It is realized that the more flywheels in the flywheel system and the closer in dimension to one another, the smaller the losses in speed will be when the clutch is disengaged but the greater the capital cost and size of the device.

The staged flywheel system will preferably make optimum use of the space within the pyramid shaped housing in order to have the housing as small as possible.

Each flywheel, except the smallest flywheel will typically have one or more clutch pads associated with the upper (or one side) in order to engage with the clutch pad of the clutch assembly.

The material of construction of the flywheels is also particularly important.

Commercial large steel flywheels currently operate with maximum tip speeds of only about 200 to 250 meters per second. The stored energy is proportional to the square of the tip speed and thus energy storage per flywheel size and weight is limited for flywheels with tip speed limited to 250 m/s. Strength and safety concerns have been factors that cause manufacturers to limit the operational speeds to 250 m/s or less. Small diameter steel flywheels can develop higher strengths due to the fabrication attributes of the reduced size. For example, small diameter steel hubs for use inside composite energy storage flywheels have been laboratory tested to higher speeds. However to date, commercial operation of large diameter steel energy storage flywheels has been limited to relatively low speeds.

For efficiently storing large amounts of energy, especially in cost sensitive applications such as energy back-up, composite flywheels are commonly considered necessary. Composite flywheels can store large amounts of energy per weight due to the high strength capability of the constituent fibres such as glass and carbon. They can also be made of large diameter size while still having the maximum strength due to the strength being added by the already high strength fibres being wound into the rim. Composite flywheels have been very expensive in the past, however the price in recent years has been dramatically reduced due both to a drop in the price of carbon fibre and also the development of new more economical commercial processes.

Unfortunately, composite material flywheels can exhibit some troublesome attributes that include poor temperature performance as well as creep and stress rupture. Most polymer matrix composite flywheels have low temperature capability, meaning that the epoxy matrix becomes soft at a relatively low temperature. The matrix loses its ability to optimally translate load between fibres with a relatively small increase in operating temperature. Because the radial strength is much lower than the hoop strength in filament wound flywheels, flywheels are usually constructed of multiple rims to mitigate radial stresses.

One very common design approach to allow use of low cost thick flywheel rims is to use a glass/epoxy ring, with its lower modulus and higher density, inside a stiffer and lower density carbon fibre/epoxy ring. The glass ring grows with the larger radius carbon ring during rotation and thus avoids development of excessive radial tension. Unfortunately, over time and cyclic stress, the inner glass fibres creep and lose stiffness thereby causing the outer carbon fibres to carry unanticipated extra load. The outer carbon fibres also fatigue and lose strength with cycles. The end result is that a seemingly safe design, that would have had an initial benign radial crack failure, can have a lower speed catastrophic burst failure. Unlike a metal flywheel, where a failure results in pieces being projected radially outward during failure, a composite flywheel can fail exerting energetic fragments vertically or alternatively the fine radially directed fragments can be redirected vertically when they hit the container wall.

A motor/generator set is typically associated with the flywheel system, and most preferably the largest flywheel. The preferred vertical shaft rests on bearings, and the entire assembly is preferably enclosed within a vacuum containment vessel. The configuration allows for compactness and reduction of rotational losses.

The electrical leads to/from the motor/generator set are preferably brought out of the vacuum containment and connected to the power conversion subsystem (PCS). The controllers of the motor/generators, bearings, vacuum/cooling system, the PCS and its controllers are all typically housed outside the containment allowing the containment housing to be as small as possible.

It may be preferred that a power takeoff means is associated with the largest of the flywheels in the assembly. Particularly preferred is that the power flywheel (which may be any of the flywheels but normally the largest) has an associated rotor and a separate stator is provided with the rotor and stator generating electricity from the rotation of the flywheel system. This configuration may make the system more compact and/or reduce friction losses from the system.

A FES system can be optimized either for power or energy. Large power ratings require large motor/generators, which themselves have the ability to store large amounts of kinetic energy because of their large mass and high rotational speeds. Optimization for energy will require relatively larger flywheels to store energy, since the smaller-sized motor/generator (smaller power rating) will not be able to store large amounts of energy.

The motor/generator used in association with the flywheel system of the present invention is typically a permanent magnet, brushless, DC drive commutated electronically. If an AC output is required or desired, the DC voltage output of the motor/generator set has to be conditioned by a typical power conversion system to interface with the external load.

Stress/strain cycles are created in the flywheel as the velocities change. In order to maintain constant voltage as the speed varies and to reduce these stress/strain cycles, the flywheel system will typically not be allowed to slow down completely. It is similar in concept to electrochemical batteries where a high depth of discharge reduces the life of the battery. The thrust bearings of FES systems will typically also have to be periodically replaced.

The power converter typically includes a combination of rectifier/inverter and a transformer where needed. When the storage subsystem is being charged, the converter behaves like a rectifier, changing the AC voltage into DC. When discharged, or when it is supplying power to the system, the converter operates as an inverter. The power converter normally includes at least one thyristor.

In the rectifier mode, the converter controls the voltage and the charging current. The voltage and the resulting current are adjusted for the desired charge rate. The conversion of AC voltage to DC is achieved by firing the thyristors so that the voltage from the transformer windings cause the desired current to flow to the storage subsystem. In the inverter mode, the converter essentially chops the DC current into segments and builds a voltage wave that is an approximation of the normal AC system sine wave.

Converters are normally given ratings in MVA, but this rating only applies at rated voltage. Converters are, in reality, current-limited devices. A converter can be used to provide active or reactive current or a combination within its current handling capability.

The power conversion control is generally divided into two loops. The 'inner loop' provides high-speed regulation of the energy storage subsystem. For instance, if a battery is being controlled to a certain power level, the controller will adjust the thyristor firing pulse so that power is maintained even when the bus voltage varies. The controller will also go into a current control mode when a drop in voltage requires converter current to rise above the converter rating to maintain power.

The inner loop may also include voltage control circuitry. This circuitry adjusts firing pulses to the thyristors so that the converter will produce or absorb reactive current as needed to regulate bus voltage. Again, the controller will go into a current control mode if the thyristor current would have to exceed thyristor rating in order to hold the desired bus voltage. The converter effectively synthesizes a waveform that is either larger or smaller in magnitude than the bus voltage, and either leads or lags the bus voltage. The voltage and power level control circuitry operate simultaneously to control the magnitude and phase of the waveform, respectively.

The 'outer loop' control is slower, and typically is a desired power level signal received from the system control centre. It could be provided by the automatic generation control system, and could be similar to the raise and lower signals sent to generating plants. It may also be just a time clock that schedules charge and discharge times so as to coincide with system peak load and low load periods, respectively. The outer loop may also include a stabilizer to modulate power when oscillations in line power or frequency occur.

In flywheel systems, the kinetic energy stored in a flywheel is converted to electrical energy by the generator and is supplied to the loads connected to the FES system. As the energy in the flywheel dissipates, the flywheel system slows down, but the generator preferably may continue to supply constant power until a specified lower speed threshold is reached. The energy may be output as a short period "burst" or as a constant, longer term current. Energy may be replenished to the flywheel when the low power input means is connected which typically accelerates the flywheel system back to its maximum specified speed, at which point the external power source is disconnected. Alternatively, the energy may be added on a substantially constant basis to maintain as much as possible, the rotational speed of the flywheel(s). Once the initial inertia of the flywheel system has been overcome, very little additional power input should be required to maintain the optimum rotational speed. Controllers are used to maintain the vacuum in the containment vessel and the magnetic bearing.

The flywheel system along with its containment vessel may be placed underground, except where portable of course, thus reducing the footprint of the system aboveground. Since the containment may be housed below the surface, the cost associated with erecting a building is also minimized. However, the power conversion system, the bearing controller, the motor/generator controller, and the vacuum/cooling systems, will all typically have to be housed separately above ground.

The device of the present invention will typically include one or more centrifugal clutches that engages automatically when its rotational velocity exceeds a certain limit, typically by weights pushed against springs by centrifugal force generated by the rotation.

Where a centrifugal clutch assembly is used to engage the first and second flywheels, the centrifugal clutch may remain engaged despite the loss of rotational velocity when the engagement first occurs. Preferably, once engaged, the centrifugal clutch will require an outside actuation to disengage.

The device of the present invention includes at least one low power input device usually associated with the smallest of the flywheels. The low power input device is preferably a motor or similar to rotate the flywheel and is most preferably powered by a renewable energy source such as solar or wind or the like.

Using a renewable energy source will effectively mean that the device of the present invention functions as a storage device as well as a power harnessing device.

The external power for the low voltage power supply is typically provided by either solar during the day and wind turbine at night, or both during the day. The renewable power is generally continuously used and, in any case the excess/surplus power will be harnessed to charge the batteries as back-up and stand-by low voltage power supply.

There may be additional low power input devices located relative to any or all of the flywheels. These may be applied to spin the flywheels up to a speed or at least begin the rotation of the flywheels before the clutch engages that particular flywheel. They may also (or alternatively) be used after the clutch has engaged that flywheel to assist with the acceleration for at least a short time.

In a fourth form, the invention resides in a centrifugal clutch assembly for selective connection of drive means with a flywheel, the assembly including:
  a. a clutch plate associated with the drive means;
  b. angle means located relative to the clutch plate, the height of the angle means decreasing towards the centre of the clutch plate; and
  c. one or more bearing means mounted relative to the clutch plate and the angle means such that the centrifugal force created by rotation of the clutch plate drives the one or more bearing means outwardly to engage with the angle means to connect the drive means with the flywheel.

The clutch assembly will preferably include a number of parallel plates at least one of which may be moveable in relation to each other towards and away from the flywheels but not radially. The plates will usually include at least a clutch plate and a guide plate. There will also typically be at least one clutch pad associated with the clutch plate for contacting the flywheel.

There is typically a mounting flange located at a first end of the clutch assembly to mount to (or relative to) the smaller of the two flywheels between which the clutch assembly is located. The flange will normally attach to the surface of the smaller flywheel using appropriate fasteners or be cast or formed integrally with the flywheel.

The flange will usually have a hollow tubular spacing portion extending from the flange with a central bore therethrough for mounting on the shaft of the flywheel system.

The guide plate is normally located at a lower end of the spacing portion. The guide plate is typically the main plate of the clutch assembly and most, if not all, of the components of the clutch assembly are preferably mounted to the guide plate.

The guide plate will preferably be a substantially circular, solid plate member with a central opening again for mounting the shaft of the flywheel system. Located between the central opening and the outer edge of the guide plate is preferably at least one and typically more than one, slot opening. The slot openings will usually radiate from the central opening and be equally spaced about the guide plate. The slot openings may have rebated edges so that the gyro weights can be at least partially received within the slot openings.

The slot openings are guide openings for the travel of the gyro weights upon which the operation of the centrifuged clutch of the present invention is based. The gyro weights are mounted relative to the slot openings to be maintained in the slot openings and to slide inwardly and outwardly in the slot openings. A portion of the gyro weight will therefore typically abut the upper surface (the surface closest to the smaller flywheel) of the guide plate. A portion of the gyro weight will also typically abut the lower surface (the surface closest to the larger flywheel) of the guide plate. There may be friction minimising means located between the abutting surfaces.

The upper and lower portions of the gyro weight will normally be attached to each other and the separation distance between them may be adjustable. Typically screw fasteners are used and loosening or tightening the screw fasteners will preferably adjust the separation distance.

Mounted relative to the lower extremity of each gyro weight will normally be a bearing or similar. The bearing may be an annular, or spherical bearing. Typically, the lower portion of the gyro weight will be provided with a bearing engagement portion which will differ in configuration depending upon the type of bearing. For example, an annular bearing will require that the bearing engagement portion be a pair of spaced apart legs with a bearing axle. The annular bearing is received between the legs and the axle extends through the bearing and engages with the legs to fix the bearing in place. Typically the bearing will be positioned such that the bearing rotates in a direction parallel to the direction of the slot opening in which the gyro weight is located. A spherical bearing will likely require a hemispherical "cup" portion to hold the spherical bearing but still allow rotation about any axis.

The location and length of the slot openings in the guide plate will preferably be such that travel of the gyro weights will be prevented beyond a particular point regardless of how much faster the guide plate rotates. The weight of the gyro weights will be optimized to determine at what rotational velocity the gyro weights are forced outwardly.

The clutch plate is normally an annular plate that is mounted to rotate about the shaft of the flywheel system. Typically a central opening is provided. The clutch plate will preferably have an upper surface (the surface closest to the smaller flywheel) and a lower surface (the surface closest to the larger flywheel). As stated previously, the clutch plate will normally be provided with at least one and typically more than one clutch pad for contacting the flywheel when the clutch assembly is engaged and normally the clutch pad(s) will be provided on or adjacent the lower surface of the clutch plate.

The clutch plate is typically mounted on the shaft of the flywheel system as well. Preferably, the clutch plate is mounted for movement towards and away from the flywheel and therefore is usually provided with a neck portion located about the shaft. The neck portion may also engage with the spacing portion of the clutch assembly and normally will be telescopically engaged allowing guided movement. There may be a locking arrangement provided between the neck portion and the spacing portion to prevent the clutch plate from moving to disengage with the flywheel once engaged due to the centrifugal force. Alternatively, there may be a mechanism to periodically engage and disengage the clutch plate from the flywheel to minimize the loss of too much speed of the drive means during the acceleration of the flywheel. The mechanism may disengage the clutch plate once the speed of the drive means drops below a predetermined speed to allow the drive means to accelerate before re-engagement.

Angle means will be provided on or adjacent the upper surface of the clutch plate. Preferably, the angle means will be provided in an annular band area towards the outer edge of the clutch plate. The angle means may be provided as a single annular angle means or as a plurality of spaced apart discrete angle means.

The angle means may be provided with locking means to prevent disengagement of the clutch plate from the flywheel once the engagement has been made. Alternatively, there may be a mechanism to periodically engage and disengage the clutch plate from the flywheel to minimize the loss of too much speed of the drive means during the acceleration of the flywheel. The mechanism may disengage the clutch plate once the speed of the drive means drops below a predetermined speed to allow the drive means to accelerate before re-engagement.

The clutch plate will normally be biased towards the guide plate by appropriate resilient means. Normally a plurality of rod or bolt members can be used extending through the guide plate and engaging (normally extending through) the clutch plate and associated with resilient means to bias the plates together. The resilience of the resilient means can determine or assist with determination of the predetermined speed at which the clutch will engage as well. Normally, the resilient means may be a spring or similar mounted about the rod and located between the guide plate and a head of the rod or bolt members.

The centrifugal clutch assembly of the invention will preferably engage and disengage automatically at a specified rotational speed through activation of centrifugal forces on the elements to overcome biasing means.

In a fifth form, the invention resides in a guide system for a rotating body, the system including a centrally mounted rotation body having at least one outer edge, and at least two guide members mounted immediately adjacent to the at least one outer edge of the rotating body, such that the rupture of the rotating body at high speeds due to material failure is reduced.

The guide members may be physical guide members such as bearing or labyrinth members located at high tolerance separation relative to the radial edges of the flywheel or they may be in other forms such as magnetically repulsive guide members. A plurality of guide members will typically be provided and are preferably spaced equidistantly about the flywheel. Typically three guide members will be provided at approximately 60° separations.

In order to minimize the energy losses of the system, each flywheel will be mounted about the central shaft with a bearing assembly to minimize friction. There will normally also be bearings provided at the ends of the shaft to minimize friction at those locations. The bearings may be of any type and the bearing types may be different depending upon location in the device. For example, magnetic bearings may be used to support the shaft at either end and roller or ball bearings may be used to support the flywheels on the shaft. Preferably, the configuration of roller or ball bearings used may differ for the larger flywheels to account for the increased dimension of the larger flywheels. Angular faced bearings may be used to absorb both axial and radial loads.

The expense of refrigeration led to the early dismissal of low temperature superconductors for use in magnetic bearings. High-temperature superconductor (HTSC) bearings however may be economic and could possibly extend the time energy could be stored economically. Hybrid bearing systems are most likely to see use first. HTSC bearings have historically had problems providing the lifting forces necessary for the larger designs, but can easily provide a stabilizing force. Therefore, in hybrid bearings, permanent magnets support the load and HTSC are used to stabilize it. The reason superconductors can work well stabilizing the load is because they are good diamagnets. In hybrid-bearing systems, a conventional magnet levitates the shaft and/or flywheel system, but the high temperature superconductor keeps it stable. If the flywheel system tries to drift off centre, a restoring force due to flux pinning restores it. This is known as the magnetic stiffness of the bearing. Rotational axis vibration can occur due to low stiffness and damping, which are inherent problems of superconducting magnets, preventing the use of completely superconducting magnetic bearings for flywheel applications.

Since flux pinning is the important factor for providing the stabilizing and lifting force, the HTSC can be made much easier for FES than for other uses. HTSC powders can be formed into arbitrary shapes so long as flux pinning is strong. An ongoing challenge that has to be overcome before superconductors can provide the full lifting force for a FES system, is finding a way to suppress the decrease of levitation force and the gradual fall of rotor during operation caused by the flux creep of SC material.

Parasitic losses such as friction, hysteresis and eddy current losses of both magnetic and conventional bearings in addition to refrigerant costs can limit the economical energy storage time for flywheels. However, farther improvements in superconductors may help eliminate eddy current losses in existing magnetic bearing designs as well as raise overall operating temperatures. Even without such improvements, however, modern flywheels can have a zero-load rundown time measurable in years.

To operate at the required high speeds, the flywheel may be supported using magnetic bearings at each end of the flywheel, preferably passive radial magnetic bearings as disclosed in international patent application no. PCT/US01/13951 filed on May 1, 2001 by Gabrys et al. and entitled "Full Levitation Bearing System with Improved Passive Radial Magnetic Bearings". The passive bearings, which can be of several configurations, reduce the amount of electronic control compared with full five active axes magnetic bearings and are simple, reliable and low cost. In one embodiment, the passive radial magnetic bearings are formed integrally in the axial faces of the flywheels or the central shaft to simplify construction while reducing costs.

The device of the present invention may also be configured to have multiple "satellite" flywheel systems "charging" a single main "planetary" flywheel associated with the power take off means. The transfer of energy from the satellite flywheel systems could be applied simultaneously to the planetary flywheel or in a sequential order.

BRIEF DESCRIPTION OF THE DRAWINGS

Various embodiments of the invention will be described with reference to the following drawings, in which.

DETAILED DESCRIPTION OF THE PREFERRED EMBODIMENT

According to a particularly preferred embodiment, an energy storage device is provided.

Figure 1:
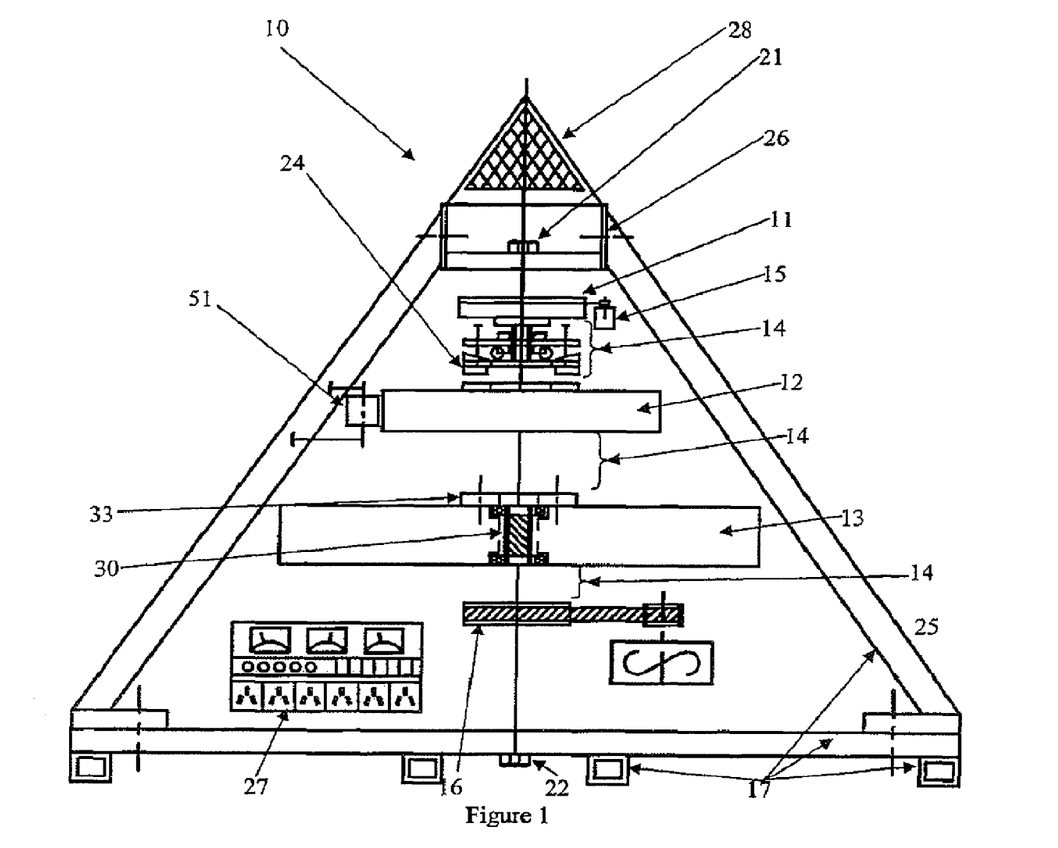
FIG. 1 is a sectional schematic view of a flywheel energy system according to a preferred embodiment of the present invention.
Figure 2:
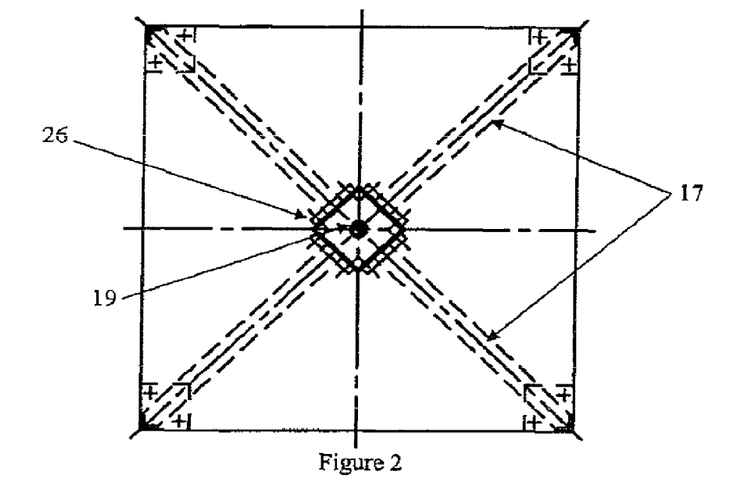
FIG. 2 is a view from above of a flywheel energy system according to a preferred embodiment of the present invention.

The energy storage device 10 of the embodiment illustrated in FIGS. 1 and 2 in particular includes a shaft member (not shown in FIG. 1) with a multistage flywheel system. According to the embodiment in FIG. 1, there are three flywheels including a first flywheel 11, a second flywheel 12 larger than the first flywheel 11, and a third flywheel 13 larger than the second flywheel 12. Each flywheel is mounted for rotation about the shaft member.

There is a clutch assembly 14 located between each of the flywheels and a low power input motor 15 and a power take-off wheel 16 associated with the third flywheel 13.

The first flywheel 11 is rotated using the low power input motor 15 and is accelerated to a predetermined rotational velocity whereupon the clutch assembly 14 engages to connect the first 11 and second 12 flywheels allowing inertial and kinetic energy to transfer between the flywheels to accelerate the second flywheel 12. A similar process is followed between the second 12 and third 13 flywheels to accelerate the third flywheel 13. Once the third flywheel 13 is rotating at the predetermined velocity, the power take off wheel 16 can be engaged and disengaged as needed to withdraw energy stored in the system.

The device 10 generally and the flywheel system in particular is enclosed by a housing both to protect the flywheel system from damage and energy depleting effects from external forces and also to prevent damage to surrounding objects should the flywheels rupture.

The preferred shape of housing is pyramidal with a base wall 18 and converging members extending from the base wall and converging at a tip or point. The converging members are triangular shaped sidewalls with support structure members 17 located extending from each corner. There is also a top support plate 26 for attaching the support structure members. There may be either three or four sidewalls depending upon the configuration of the housing. Provision of sidewalls allows the housing to be substantially sealed with the flywheel system inside to define the vacuum containment area.

There are many different types of vacuum containment systems for flywheel energy systems such as that described in U.S. Pat. No. 7,053,589 and any of these may be used provided that they are suitable to maintaining the vacuum without leaching energy from the flywheel system.

There is a single shaft member 19 provided according to the illustrated embodiment. The shaft 19 of the illustrated embodiment is mounted for rotation of the flywheels about a vertical axis and the shaft is fixed in place. The shaft 19 extends from adjacent the base wall 18 of the housing where it is located by a bottom mount 20 to a top mount 21 adjacent the point of the housing.

Figure 3:
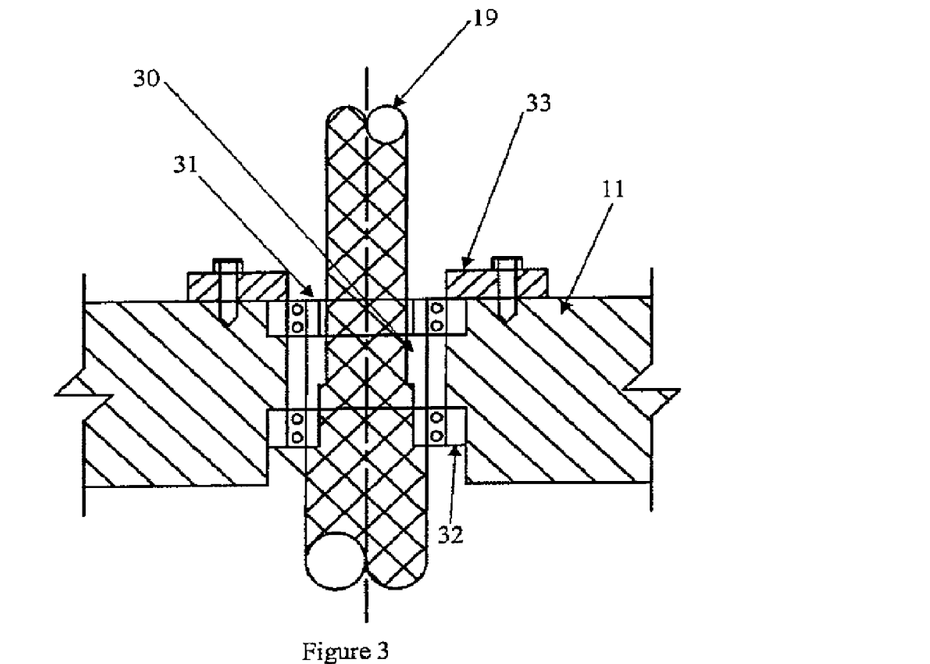
FIG. 3 is a sectional side view of a bearing for supporting a smaller flywheel according to a preferred embodiment of the present invention.
Figure 4:
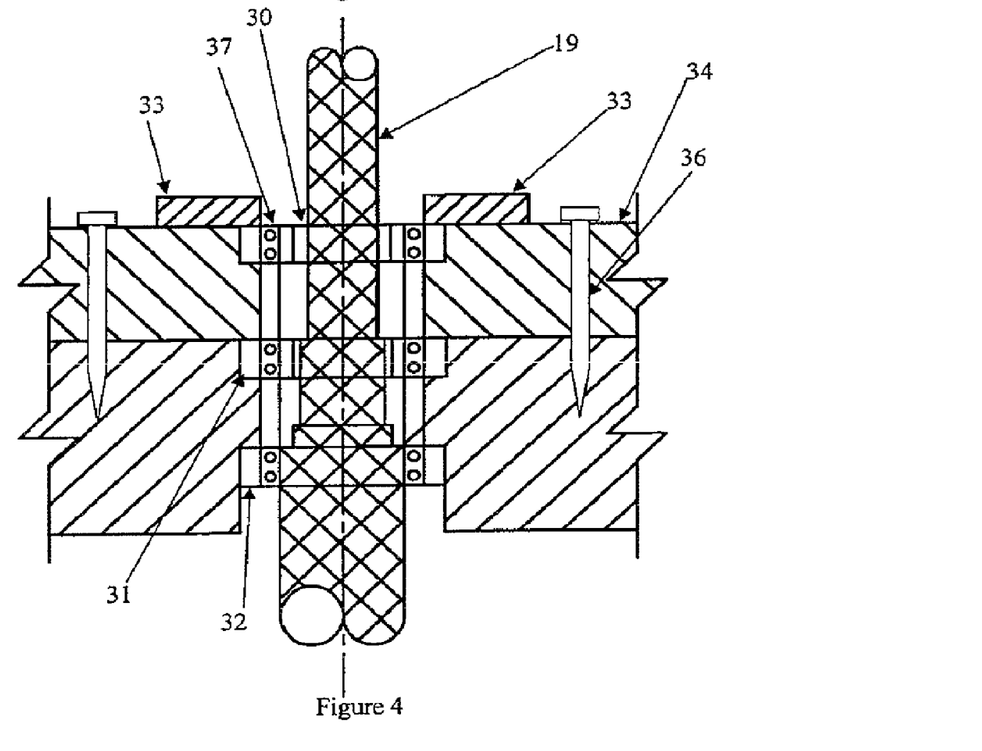
FIG. 4 is a sectional side view of a bearing for supporting a larger flywheel according to a preferred embodiment of the present invention.

The shaft 19 has a circular cross-section and includes a plurality of stepped portions of generally cylindrical shape and increasing in cross-sectional dimension as the flywheel dimension increase as illustrated in FIGS. 3 and 4.

The shaft 19 is manufactured of metal for lower speed applications and composite materials for higher speed applications.

As the shaft is a fixed shaft, the flywheels are supported on the shaft using appropriate bearings 29 and as illustrated particularly in FIGS. 3 and 4. The bearing of FIG. 3 is used for a smaller flywheel and includes a sleeve 30 fixed to the shaft 19 and an upper 31 and lower 32 bearing module. There is also a top plate 33 fixed to the flywheel by fasteners to secure the bearing in place.

The bearing of FIG. 4 is used for a larger flywheel which is of the split flywheel configuration. There is therefore an upper flywheel section 34 and a lower flywheel section 35 connected by bolts 36 in the position indicated. The bearing 29 includes a sleeve 30 fixed to the shaft 19 and an upper 31 and lower 32 bearing module located relative to the lower flywheel section 35. There is a third bearing module 37 located relative to the upper flywheel section 35. Again, a top plate 33 fixed to the upper flywheel section 34 by fasteners secures the bearing 29 in place.

The flywheels 11, 12, 13 are annular in configuration with an opening to accept the shaft or the shaft with appropriate bearings, located in the centre of the flywheel.

Figure 5:
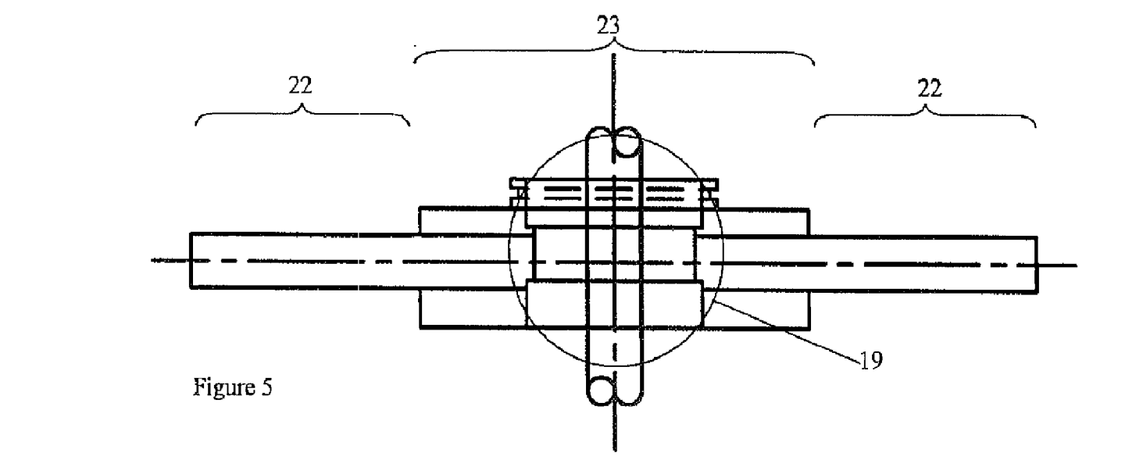
FIG. 5 is a sectional side view of an input flywheel according to a preferred embodiment of the present invention.
Figure 6:
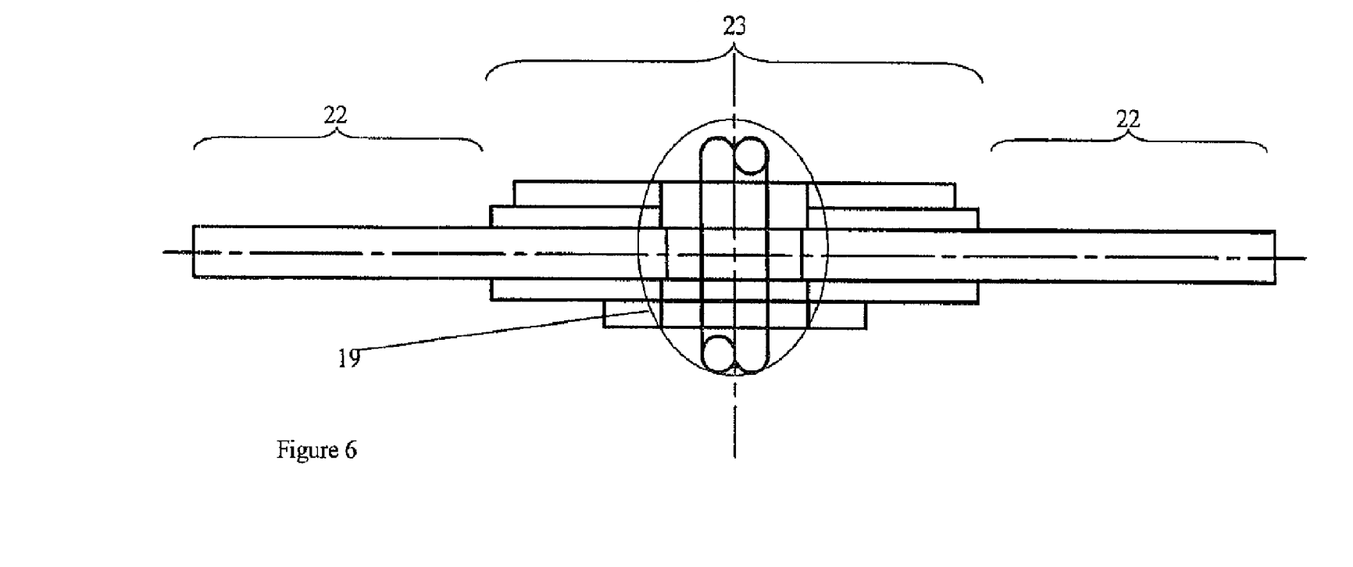
FIG. 6 is a sectional side view of a larger flywheel according to a preferred embodiment of the present invention.

As illustrated in FIGS. 5 and 6, each flywheel has a stepped cross-section with a thinner outer annular portion 22 surrounding or extending from a thicker central annular portion 23. The flywheels will be of unitary construction when smaller and generally split flywheels when larger.

The flywheels are staged along the height of the shaft 19 with a clutch assembly 14 located between each of the flywheels. The flywheels increase in dimension toward one end of the shaft 19, the increase in dimension having a related increase in inertia.

Each flywheel except the first flywheel 11 has one or more clutch pads 24 associated with the upper side in order to engage with the clutch pad 24 of the clutch assembly 14.

For efficiently storing large amounts of energy, especially in cost sensitive applications such as energy back-up, composite flywheels are commonly considered necessary.

A motor/generator set 25 is associated with the flywheel system, and in the illustrated embodiment, with the third flywheel 13. The electrical leads to/from the motor/generator set 25 may be brought out of the vacuum containment and connected to the power conversion subsystem (PCS), or mounted onto an electrical socket assembly 27 on the outside of the housing.

The motor/generator set 25 used in association with the flywheel system of the present invention is typically a permanent magnet, brushless, DC drive commutated electronically. If an AC output is required or desired, the DC voltage output of the motor/generator set 25 has to be conditioned by a typical power conversion system to interface with the external load.

The device of the present invention includes a low power input motor 15 associated with the smallest of the flywheels. The low power input motor 15 is powered by a renewable energy source such as solar cell 28 located at the point of the housing or over a substantial portion of one or more of the side walls of the housing.

In flywheel systems, the kinetic energy stored in a flywheel is converted to electrical energy by the generator and is supplied to the loads connected to the FES system. As the energy in the flywheel dissipates, the flywheel system slows down, but the generator preferably may continue to supply constant power until a specified lower speed threshold is reached. The energy may be output as a short period "burst" or as a constant, longer term current. Energy may be replenished to the flywheel when the low power input means is connected which typically accelerates the flywheel system back to its maximum specified speed, at which point the external power source is disconnected. Alternatively, the energy may be added on a substantially constant basis to maintain as much as possible, the rotational speed of the flywheel(s). Once the initial inertia of the flywheel system has been overcome, very little additional power input should be required to maintain the optimum rotational speed. Contollers are used to maintain the vacuum in the containment vessel and the magnetic bearing.

The device of the present invention includes centrifugal clutches 14 that engage automatically when its rotational velocity exceeds a certain limit.

Where a centrifugal clutch assembly is used to engage the first and second flywheels, the centrifugal clutch may remain engaged despite the loss of rotational velocity when the engagement first occurs. Preferably, once engaged, the centrifugal clutch will require an outside actuation to disengage.

Figure 7:
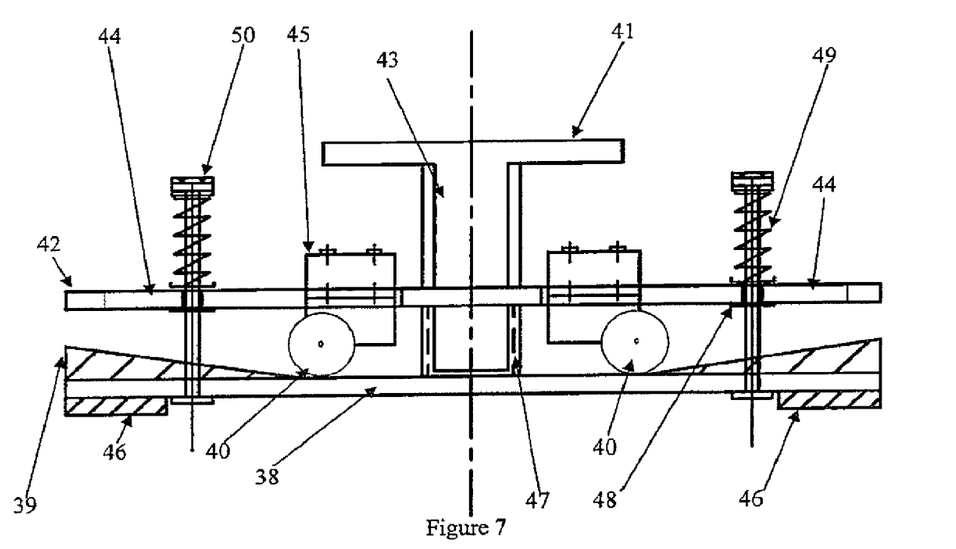
FIG. 7 is a sectional side view of a centrifugal clutch according to a preferred embodiment of the present invention.

The embodiment of a centrifugal clutch assembly 14 for selective connection of the flywheels illustrated in FIG. 7 includes a clutch plate 38 associated with the upper flywheel, angle means 39 located relative to the clutch plate 38, the height of the angle means 39 decreasing towards the centre of the clutch plate 38, and bearing means 40 mounted relative to the clutch plate 38 and the angle means 39 such that the centrifugal force created by rotation of the clutch plate 38 drives the bearing means 40 outwardly to engage with the angle means 39 to connect the upper flywheel with the lower flywheel.

The clutch assembly 14 includes a clutch plate 38 and a guide plate 42. There is a mounting flange 41 located at a first end of the clutch assembly 14 to mount to the smaller of the two flywheels between which the clutch assembly 14 is located. The flange 41 attaches to the surface of the smaller flywheel using appropriate fasteners.

The flange 41 has a hollow tubular spacing portion 43 extending from the flange 41 with a central bore therethrough for mounting on the shaft 19 of the flywheel system.

The guide plate 42 is located at a lower end of the spacing portion 43. The guide plate 42 is the main plate of the clutch assembly 14 and most, if not all, of the components of the clutch assembly 14 are mounted to the guide plate 42.

The guide plate 42 is a substantially circular, solid plate member with a central opening again for mounting the shaft 19 of the flywheel system. Located between the central opening and the outer edge of the guide plate 42 are a number of slot openings 44. The slot openings 44 radiate from the central opening and are equally spaced about the guide plate 42. The slot openings 44 have rebated edges so that gyro weights 45 can be partially received within the slot openings 44.

The slot openings 44 are guide opening for the travel of the gyro weights 45 upon which the operation of the centrifugal clutch is based. The gyro weights 45 are mounted relative to the slot openings 44 to be maintained in the slot openings 44 and to slide inwardly and outwardly in the slot openings 44. A portion of the gyro weight will therefore be placed relative to the upper surface (the surface closest to the smaller flywheel) of the guide plate 42. A portion of the gyro weight 45 will also typically be placed relative to the lower surface (the surface closest to the larger flywheel) of the guide plate 42. There may be friction minimising means located between the abutting surfaces.

The upper and lower portions of the gyro weight are attached to each other and the separation distance between them may be adjustable. Typically screw fasteners are used and loosening or tightening the screw fasteners will adjust the separation distance.

Mounted relative to the lower extremity of each gyro weight 45 is the bearing 40. The bearing 40 illustrated is an annular bearing. The annular bearing requires that a bearing engagement portion be a pair of spaced apart legs with a bearing axle. The annular bearing is received between the legs and the axle extends through the bearing and engages with the legs to fix the bearing in place. The bearing is positioned such that the bearing rotates in a direction parallel to the direction of the slot opening in which the gyro weight is located.

The location and length of the slot openings 44 in the guide plate is such that travel of the gyro weights 45 is prevented beyond a particular point regardless of how much faster the guide plate 42 rotates. The weight of the gyro weights 45 is optimized to determine at what rotational velocity the gyro weights 45 are forced outwardly.

The clutch plate 38 is an annular plate that is mounted to rotate about the shaft 19 of the flywheel system with the flywheel. Typically a central opening is provided. The clutch plate 38 has an upper surface (the surface closest to the smaller flywheel) and a lower surface (the surface closest to the larger flywheel). The clutch plate 38 has one or more clutch pads 46 for contacting the flywheel when the clutch assembly 14 is engaged and the clutch pad(s) are provided on or adjacent the lower surface of the clutch plate 38.

The clutch plate 38 is mounted for rotation about the shaft 19 of the flywheel system as well. The clutch plate 38 is mounted for movement towards and away from the flywheel and therefore is usually provided with a neck portion 47 located about the shaft 19. The neck portion 47 also engages with the spacing portion 43 of the clutch assembly 14 and normally will be telescopically engaged allowing guided movement.

Angle means 39 are provided on or adjacent the upper surface of the clutch plate 38. The angle means 39 are provided in an annular band area towards the outer edge of the clutch plate 38.

The clutch plate 38 is biased towards the guide plate 42 by appropriate resilient means. Normally a plurality of rod or bolt members 48 are used extending through the guide plate 42 and extending through the clutch plate 38 and associated with resilient means to bias the plates together. The resilient means of the illustrated embodiment is a spring 49 mounted about the rod 48 and located between the guide plate 42 and a head 50 of the rod 48.

There is a further labyrinth guide provided for each rotating flywheel. Each labyrinth guide member 51 is mounted immediately adjacent to the outer edge of the flywheel, such that the rupture of the rotating body at high speeds due to material failure is reduced.

The labyrinth guide members 51 illustrated are physical guide members in the form of fixed or rotating bearing members located at high tolerance separation relative to the radial edges of the flywheel. According to the illustrated embodiment, three labyrinth guide members 51 are provided at approximately 60° separations about each flywheel.

A preferred embodiment of the system of the present invention has been tested and the statistics and results relating to that embodiment and the testing is summarized in Tables 1 and 2 below.

Figure 8:
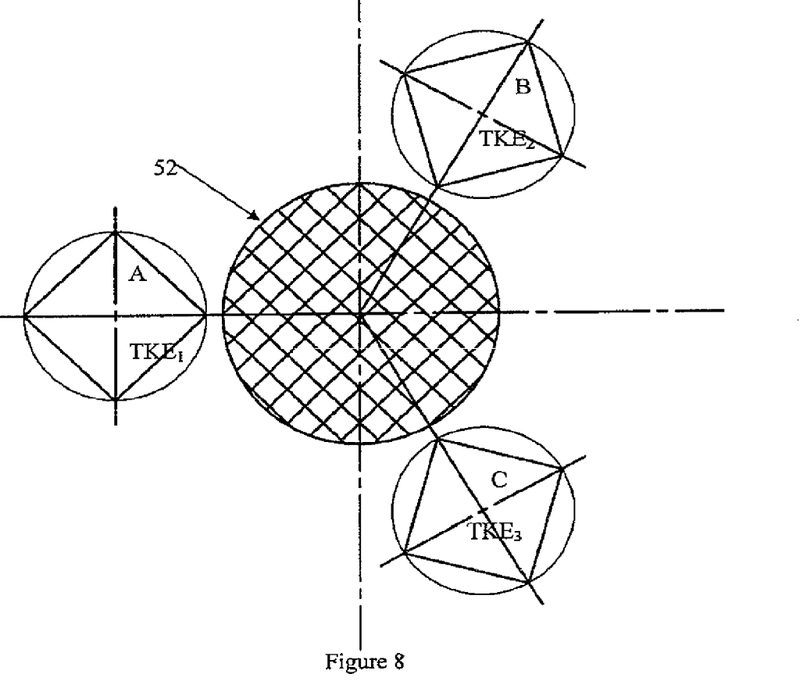
FIG. 8 is a schematic view from above of a multiple input flywheel energy system according to a preferred embodiment of the present invention.

As illustrated in FIG. 8, the device of the present invention can also be configured to have multiple "satellite" flywheel systems (A), (B) and (C) "charging" a single main "planetary" flywheel 52 associated with the power take off means. The transfer of energy from the satellite flywheel systems could be applied simultaneously to the planetary flywheel or in a sequential order. The timing of the application of the power to the main flywheel is illustrated in FIG. 9 and discussed below.

Figure 9:
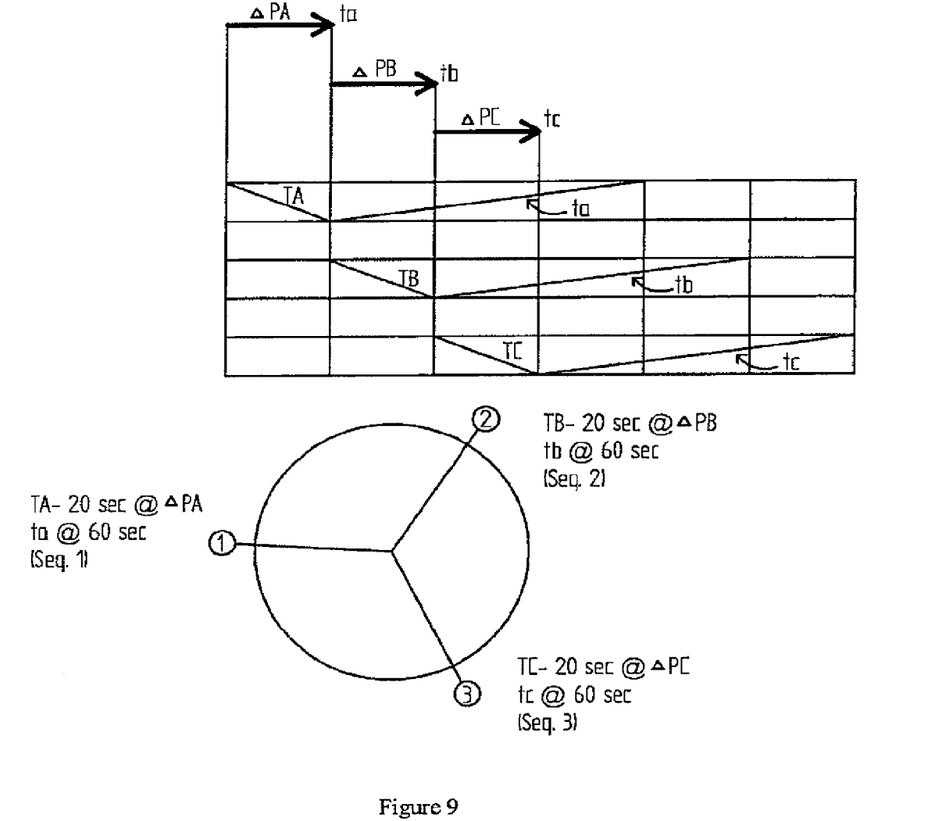
FIG. 9 is a graphical representation of the staged inputs from the multiple input flywheel energy system illustrated in FIG. 8.

Legend for FIG. 9:
Satellite System (A): t(A); T(A); ΔP(A)
Satellite System (B): t(B); T(B); ΔP(B)
Satellite System (C): t(C); T(C); ΔP(C)
t(A)=time required for the inertia wheel to build-up the required Torque Kinetic Energy in the final flywheel in satellite system unit (A).
t(B)=time required for the inertia wheel to build-up the required Torque Kinetic Energy in the final flywheel in satellite system unit (B).
t(C)=time required for the inertia wheel to build-up the required Torque Kinetic Energy in the final flywheel in satellite system unit (C).
T(A)=Time for the transfer of Torque Kinetic Energy from satellite system unit (A) onto the MFW.
T(B)=Time for the transfer of Torque Kinetic Energy from satellite system unit (B) onto the MFW
T(C)=Time for the transfer of Torque Kinetic Energy from satellite system unit (C) onto the MFW
$TKE_1$=Total Torque Kinetic Energy in satellite system unit (A)
$TKE_2$=Total Torque Kinetic Energy in satellite system unit (B)
$TKE_3$=Total Torque Kinetic Energy in satellite system unit (C)
ΔPA=The amount of Power/Torque that is transferred onto MFW by satellite system unit (A) final flywheel—that will sustain rotation (W) and fast build-up to the required Torque Kinetic Energy in satellite system unit (A).
ΔPB=The amount of Power/Torque that is transferred onto MFW by satellite system unit (B) final flywheel—that will sustain rotation (W) and fast build-up to the required Torque Kinetic Energy in satellite system unit (B).
ΔPC=The amount of Power/Torque that is transferred onto MFW by satellite system unit (C) final flywheel—that will sustain rotation (W) and fast build-up to the required Torque Kinetic Energy in satellite system unit (C).

According to the illustrated embodiment, there are three (3) satellite flywheel system units (A), (B), and (C), each transferring Torque Kinetic Energy (TKE); being $TKE_1$, $TKE_2$ and $TKE_3$ respectively, onto the Main Fly Wheel (MFW) in sequence mode. This embodiment having satellite flywheel system units and a main flywheel can also be housed in a pyramidal housing, thus preserving its compactness, robust structure, effective, and simplicity for erection, which ultimately will have potential for the unit cost to be reduced significantly.

MFW Torque Kinetic Energy is transferred to an alternator to produce constant DC electrical power.

TABLE 1

| PortalGen Design and Optimisation Program | | | | | | | | |
|---|---|---|---|---|---|---|---|---|
| density kg/m3 | 4500 | AL marine | | PortalGen Corporation | | | August 06 | |
| Items | Stage 1 (IIF) | Stage 2 | Stage 3 | Stage 4 | Stage 5 | Stage 6 | Power Torque | |
| k constant | 0.85 | | | | | | | |
| Diameter m | 0.155 | 0.255 | 0.375 | | | | | |
| Thickness m | 0.012 | 0.011 | 0.025 | | | | | |
| Core Dia. | 0.01 | 0.015 | 0.025 | | | | | |
| Radius | 0.0775 | 0.1275 | 0.1875 | 0 | 0 | 0 | 0 | |
| Area m2 | 0.018859625 | 0.051044625 | 0.110390625 | 0 | 0 | 0 | 0 | |
| Circfrnce m | 0.4867 | 0.8007 | 1.1775 | 0 | 0 | 0 | 0 | |
| Mass | 1.44341975 | 2.951708938 | 12.84394531 | 0 | 0 | 0 | 0 | |
| RPM | 4,844 | 1513.75 | 1513.75 | #DIV/OI | #DIV/OI | #DIV/OI | #DIV/OI | |
| Speed/W | 39.29291333 | | | | | | | |
| GyroClutch W | 0.425 | 0.425 | 0.425 | | | | | |
| Inertia | 0.007369109 | 0.040786161 | 0.38381321 | 0 | 0 | 0 | 0 | |
| Kinetic Energy | 5.68870534 | 31.48555047 | 296.290947 | 0 | 0 | 0 | 296.290947 | |
| Watt · hr (Wh) | 0.094811756 | 0.524759174 | 4.938182456 | | | | | 0.019199727 |
| | | | | | | | | 1.50% |
| Acc. time | | | | | | | | 52.08407355 |
| Kinetik - Power - Torque (Nm) Kgm2/v2; (Kgm/s2).m; | | | | | | | | |
| RadForce/Nm | 0.44087466 | 4.014407685 | 55.5545526 | 0 | 0 | 0 | 0 | |
| F/W pwr (kW) | 0.16956718 | 1.544002956 | 21.3671356 | | | | | |

Note:
Prototype Designs and Performance; based on three (3) stage flywheels.
Gyro-Weights = Gyro-Weights Centrifugal Force > to be 10% higher than the Inertia Load Springs.
Acc. Time = the time required for the full kinetik power is absorbed and produces the ultimate power.
Bearing Axial Load, kN... a = min. load factor n = rotational speed RPM
F = a(n/1000)2
Angled faced (Angular contact) ball bearings for axial and radial loads.
Basic Dynamic Load Rating
Basic Static Load Rating
Fatigue Load Limit
Min. Load Factor
Speed Rating xxxx rpm

TABLE 2

Energy Storage and Applications; Prototype Parameters;
Aust Patent Pending Number: 2006905283/25/9/2006 August 07

Specific Energy Consumption:
Specific Stored Regenerative Stored Energy:
Specific Stored Degenerative Energy:
Fly-Wheel Density in (Wh/kg):
Fly-Wheel Capacity in (KW):

Basic Data:

Pulley sizes; F/W Speeds; Torque Calculations;
Power Calculations; Power discharge;

| Pulley Sizes: (dia mm) | | | |
|---|---|---|---|
| InertiaMtr(IM): | 10 | F/W2gyrocltch: | 80 |
| Inertia F/W1: | 25 | Pwr F/W(F/Wp): | 116 |
| F/W1gyrocltch: | 80 | Generator: | 43 |

| Speed on Tachimeter and Calculations: (rev per minute; rpm) | | | |
|---|---|---|---|
| Inertia Motor: | | 12,110 | |
| Ratio: | | Speed: | (rpm) |
| IM/F/W1: | 0.4 | Inertia F/W | 4844 |
| F/W1g/clutch: | 0.3125 | F/W1 gyroclutc | 1513.75 |
| F/W2g/clutch: | 0.3125 | F/W2 gyroclutc | 1513.75 |
| F/W2/F/Wp: | 0.689655172 | F/Wp | 1043.965517 |
| F/Wp/Gnrtr: | 2.697674419 | Generator | 2816.27907 |

| Torque Calculations, Kinetik Energy and Power Created: (kWh) | | Energy Stored: (Wh) | | (Wh/kg) | Power Calculations: (kW) | |
|---|---|---|---|---|---|---|
| F/W1: | 0.169567178 | F/W1: | 0.169557178 | 117.4759999 | F/W1: | |
| F/W2: | 1.544002956 | F/W2: | 1.544002956 | 523.0878072 | F/W2: | |
| F/Wp: | 21.36713563 | F/Wp: | 21.36713563 | 1663.595967 | F/Wp: | |

| Power Discharged: (Wh; kWh) | Power Discharge on MEGA-5 unit: (Wh; kWh) | |
|---|---|---|
| F/Wp: | Planetary Wheel Capacity: | MW |
| | Planetary Wheel Discharge: | kWh; MWh |

THE PURPOSE FOR THE INVENTION:
Hi-capacity energy fast recharge/discharge; Store greater amount of energy for longer periods/sustain discharge; Frequency spinning rsrv; Gen Cap trans/disir deferral and stability; Voltage/load levelling; Peak loads reduction; Power reliablity&quality. No need for large area sun-collectors and battery super-banks. The invention serves as a continuosly clean, renewable power supply for normal-home economically.
THE INVENTION'S OPERATIONS AND NEXT TASKS:
*The energy storage Fly-wheel (F/W) converts electrical energy into kinetik energy by spinning a rolar at high speed and then converts the kinetik energy back into electricity through a generator.
*The Multi-Stage F/Wheels provides fast-regenerative/recharge.
*The Inertia motor operates via power from a dedicated battery. This standard 12 V battery at 110 Ah, works 2 days continuously on one short-charge.
*The solar-prism photovoltaic charges Inertia Motor battery, then charge the supply battery connected to an Inverter for power main-supply.
*The Power FlyWheel turns the Generator to charge the supply battery.
*There are two(2)electrical circuits being one for minimum loads for lights, fridge, radio, tv, clocks; and second for peak loads for oven, micowave, etc.
*The system has auto-reclose activated by load-systems.
*The typical power supply capacity is 4.05 kWh; with peak demand supplied from the supply-battery to 6.55 kWh; the regenerative/recharge takes about 1-2 minutes to recharge the supply-battery.
*Gyroclutch auto-synch release at 15% energy drop; then regenerate for ~1 min to energy-max; then discharges KE to the next F/Ws.
*Next Tasks to include completion of proof-of-concept test results on pilot plant and precommercial device model; Use commercial Implementation through cost sharing and incentives to industry, GHG abatements. Policies and Govt's grants, initiatives, and mandatory-renewables take-up Legislations; Resulting in Invention to address macro-issue of baseload largescale power generation on micro-level solving ultimately yield sustainable outcomes.

Figures 10, 11:
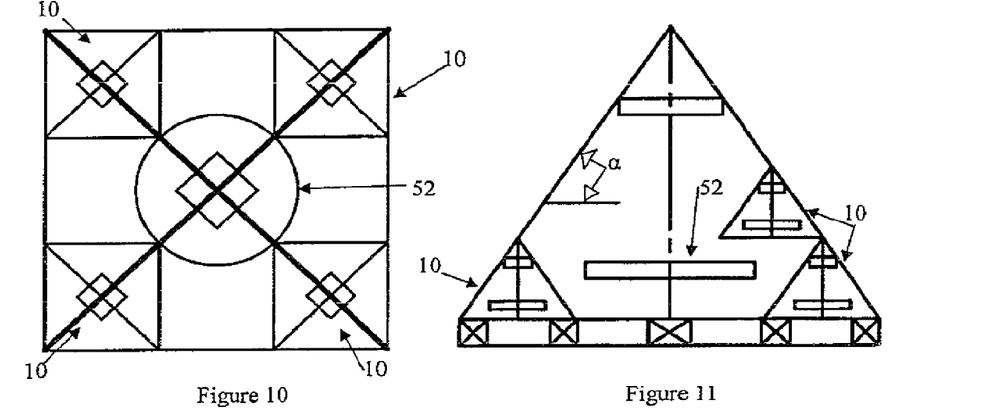
FIG. 10 is a sectional view from above an alternative embodiment of a multiple input flywheel energy system.
FIG. 11 is a sectional side view of the multiple input flywheel energy system illustrated in FIG. 10.

According to the multiple input flywheel energy system illustrated in FIGS. 10 and 11, there are a number of satellite flywheel systems surrounding a main planetary wheel which is powered by the satellite systems. According to the preferred embodiment illustrated, the multiple input flywheel energy system is provided in a pyramidal configuration, and preferably a square-based pyramid with four triangular sides meeting at a tip The main planetary flywheel is located along an approximately central axis extending downwardly from the point of the pyramid to the centroid of the base. A plurality of satellite systems is provided, and the satellite systems are typically provided one in each corner of the pyramid adjacent the base. One or more satellite systems may be provided above the base but in communication with the main planetary wheel assembly.

The sidewalls of the pyramid construction will typically include and more preferably will be solar collector arrays. The angle α of the triangular sidewalls relative to the basewall of the pyramid assembly is preferably chosen to optimize is the collection of solar energy in terms of the length of time per day that the sun strikes a least one of the sidewalls.

The pyramid will typically enclose to be the main planetary wheel and the satellite systems. Given that the system will normally be located in the sun in order to utilize the solar panels, a fan or similar heat extraction or control means may be provided, preferably in an upper level of the pyramid in order to remove heat from within the pyramid enclosure.

During operation, the main planetary wheel is preferably powered via the satellite systems at short intervals of approximately 5-6 seconds and the satellite systems may stagger their transfer of momentum is such that the main planetary wheel is being powered more or less continuously.

In the present specification and claims (if any), the word "comprising" and its derivatives including "comprises" and "comprise" include each of the stated integers but does not exclude the inclusion of one or more further integers.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more combinations.

The invention claimed is:

1. An energy storage device including at least one non-rotating shaft member, at least a pair of flywheels including a first flywheel and a second flywheel larger than the first flywheel, each flywheel associated with the at least one shaft member, a centrifugal clutch assembly associated with each of the flywheels, at least one low power input device, and a power take off means associated with the second flywheel, wherein the first flywheel is rotated using the low power input device and is accelerated to a predetermined rotational velocity whereupon the clutch assembly engages to connect the first and second flywheels allowing inertial and kinetic energy to transfer between the flywheels to accelerate the second flywheel.

2. A device according to claim 1 wherein the flywheels are enclosed by a housing.

3. A device according to claim 2 wherein the housing is pyramidal with a base wall and converging members extending from the base wall and converging at a tip or point.

4. A device according to claim 1 including a single shaft member with the flywheels mounted relative thereto.

5. A device according to any one of the preceding claims wherein the at least one shaft is oriented substantially vertically.

6. A device according to claim 1 wherein the shaft has a circular cross-section and tapers in thickness towards the first flywheel.

7. A device according to claim 1 wherein the shaft has a circular cross-section and includes a plurality of stepped portions of cylindrical shape and increasing in cross-sectional dimension as the flywheel dimension increase.

8. A device according to claim 1 wherein the flywheels have an annular configuration with an opening to accept the shaft located in the centre of the flywheel.

9. A device according to claim 1 wherein each flywheel has a stepped cross-section with a thinner outer annular portion surrounding a thicker central annular portion.

10. A device according to claim 1 wherein at least one of the flywheels is a split flywheel to allow the thrust/load of the flywheel to be distributed on the shaft both radially and longitudinally to reduce the friction loss.

11. A device according to claim 1 including a plurality of flywheels staged along the shaft with a clutch assembly located between each of the flywheels.

12. A device according to any claim 11 wherein the flywheels increase in dimension toward one end of the shaft, the increase in dimension having a related increase in inertia.

13. A device according to claim 11 wherein each flywheel, except the smallest flywheel in the device has one or more clutch pads associated with in order to engage with a clutch pad of an adjacent clutch assembly.

14. A device according to claim 1 including a power converter including a motor/generator set associated with a flywheel.

15. A device according to claim 14 wherein the motor/generator used in association is a permanent magnet, brushless, DC drive commutated electronically.

16. A device according to claim 14 wherein the power converter includes a combination rectifier/inverter and a transformer.

17. A device according to claim 14 including a power conversion control including high-speed regulation of an energy storage subsystem, and voltage control circuitry.

18. A device according to claim 1 including at least on centrifugal clutch that engages automatically when the rotational velocity exceeds a predetermined value determined according to the size of the flywheels.

19. A device according to claim 1 including at least one low power input device associated with the smallest of the flywheels to rotate the flywheel.

20. A device according to claim 19 wherein the at least one low power input device is powered by a renewable energy source.

21. A device according to claim 1 having multiple "satellite" flywheel systems charging a single main planetary flywheel associated with a power take off means.

22. An energy storage device including at least one non-rotating shaft member, a first flywheel, at least one low power input device for rotating the first flywheel to a predetermined rotational velocity, a second flywheel of greater dimension than the first flywheel, a centrifugal clutch assembly associated with the first and second flywheels for separating the flywheels and engaging the first flywheel with the second flywheel upon the first flywheel attaining the predetermined velocity, and a power take off means associated with the second flywheel.

* * * * *